Aug. 30, 1927.
J. R. BRUECKNER
1,640,877
ALTERNATING CURRENT WELDING SYSTEM
Filed March 26, 1924
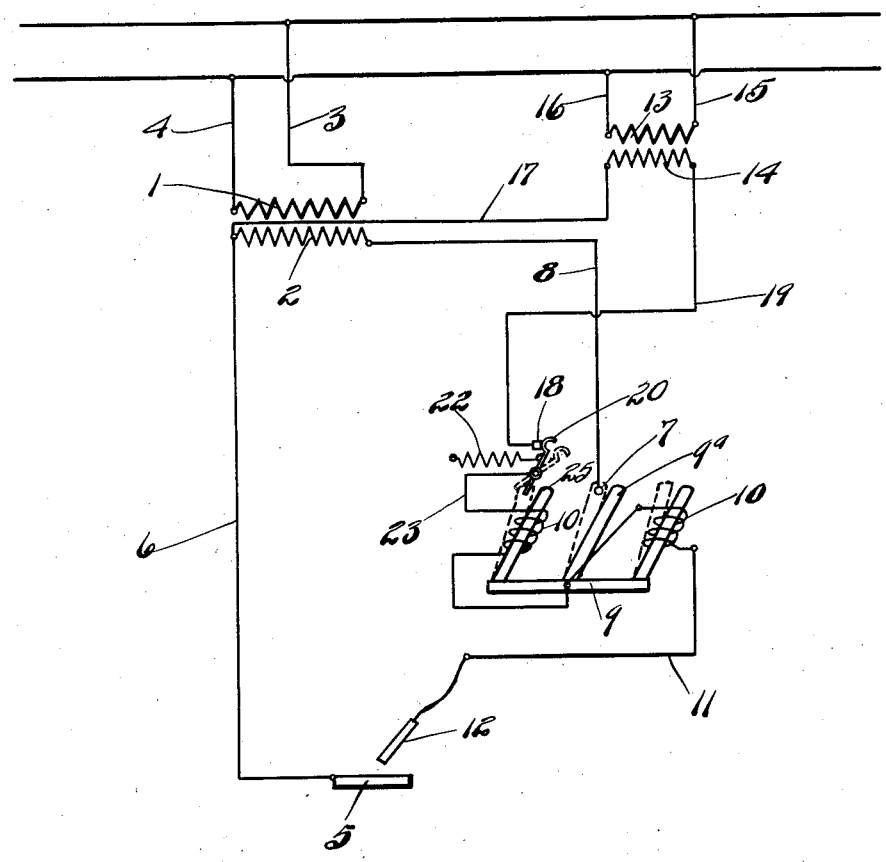
INVENTOR.
Julius R. Brueckner
BY
Frank C. Earman
ATTORNEY.

Patented Aug. 30, 1927.

1,640,877

UNITED STATES PATENT OFFICE.

JULIUS R. BRUECKNER, OF BAY CITY, MICHIGAN, ASSIGNOR TO GIBB INSTRUMENT COMPANY, A CORPORATION OF MICHIGAN.

ALTERNATING-CURRENT WELDING SYSTEM.

Application filed March 26, 1924. Serial No. 701,932.

This invention relates to arc welding systems and particularly to alternating current arc welding systems.

One object of the invention resides in the provision of an alternating current welding system in which a high voltage is employed, and in which means is provided for automatically switching to a relatively low open circuit voltage.

Another object is to provide a substantial and simple alternating current welding system in which an arc is easily established, and which eliminates any shock hazard to the operator, by automatically establishing a low open circuit voltage when the system is not in operation.

A further object is to provide an alternating current arc welding system of very simple construction, which will insure strong and homogeneous welds even by moderately skilled operators.

A still further object is to provide two distinct and separate circuits, one high voltage for use in drawing and maintaining the arc, the other low voltage for use when the system is not in operation, the switching from one to the other being governed by the relation of the electrode to the work.

With the above and other objects in view, my invention will be more fully described, illustrated in the accompanying drawing and particularly pointed out in the appended claims, it being understood that changes may be made in the general arrangement and hook-up of the system without departing from the spirit of the invention.

In the drawing:

The figure is a diagram of welding system embodying my invention.

In practise I provide a welding transformer having a primary winding 1 and a secondary winding 2, the primary winding being connected to suitable alternating current supply lines by the conductors 3 and 4. One terminal of the primary winding 2 is connected to the work 5, by the conductor 6, the opposite terminal being connected to a contact 7 by means of a conductor 8, and thence making connection with the electrode and completing the circuit in a manner to be presently described.

An electromagnetic switch 9' is interposed in this circuit, and comprises a contactor 9ª together with electromagnetic windings 10, a conductor 11 leading from the switch to the electrode 12 and when the circuit is energized, the switch 9 engages the contact 7 for energizing the low voltage circuit.

In the drawing the electromagnetic switch is shown in the full lines in open position, the dotted lines illustrating it closed and the low voltage circuit open, and when an arc is struck, the electromagnetic switch is energized and the high voltage circuit is closed, the current leading from the secondary winding back to the work, through the electrode and switch, back to the transformer.

For establishing a low open circuit voltage when the system is not in operation, I provide an auxiliary transformer having a primary winding 13 and a secondary winding 14, the primary winding being connected to the power supply lines by the conductors 15 and 16. The one terminal of the secondary winding being connected to the terminal on the welding transformer by the conductor 17, thence leading to the work. The opposite terminal is connected to a contact 18 by the conductor 19, a switch 20 being pivotally mounted at a point directly adjacent the electromagnetic switch 9, and is held in engagement with said contact by means of the spring 22. A conductor 23 leads through the electromagnetic windings 10, thence through the conductor 11 to the electrode. In this arrangement it will be seen that the voltage applied to the electrodes is that delivered by the secondary winding of the auxiliary transformer, or twenty-five volts which is a negligible factor to the ordinary operator when considered from the standpoint of shock hazard.

Simultaneously when the electrode makes contact with the work, the electromagnetic switch 9 is energized, engaging the contact 7 energizing the high voltage circuit, the member 25 simultaneously engages the end of the switch 20, elongating the spring 22 and closing the low voltage circuit, and the voltage applied to the electrodes will then be that generated by the welding transformer or one hundred and ten volts, consequently it will be obvious that I employ two distinct circuits, one of which is automatically opened when the other is closed, and while in the present instance I have shown a very simple hook-up, it will be obvious that I may also provide an impedance or reactor in the circuit to compensate for any fluctuations caused by variance in the length of arc, due to faulty handling of the electrode by the operator, or for any other reason without departing from the invention.

What I claim is:—

1. An alternating current arc welding system comprising transformers of major and minor voltage electrically connected together, a magnetic switch normally connected with the minor voltage transformer and adapted to be connected with the major transformer when connection with the minor transformer is broken and an electrode connected with the switch, whereby a high operating voltage is obtained when the arc is struck.

2. An alternating current arc welding system comprising a source of current of relatively high voltage, a transformer of major voltage connected with the source of current, a transformer of high voltage connected with the source of current, a conductor connecting the secondary winding of the transformers together, a work engaging conductor connected with the secondary winding of the major voltage transformer, a terminal electrically connected with the secondary winding of the major voltage transformer, a magnet operated switch having a blade adapted to contact with the terminal when the magnet is energized, an electrode electrically connected with the coil of the switch and a conductor including a normally closed pivoted switch connected with the coil of the magnet switch and the secondary winding of the transformer of minor voltage, the parts being so arranged that when the electrode is positioned in arcing relation to the work an electric current is initially established from the transformer of minor voltage through the magnet of the switch and causing the same to engage the contact and open the pivoted switch and finally establishing an electric circuit from the transformer of major voltage to the electrode.

In testimony whereof I affix my signature.

JULIUS R. BRUECKNER.